(No Model.)
W. PRINDLE.
Track Clearer for Mower.
No. 229,181. Patented June 22, 1880.
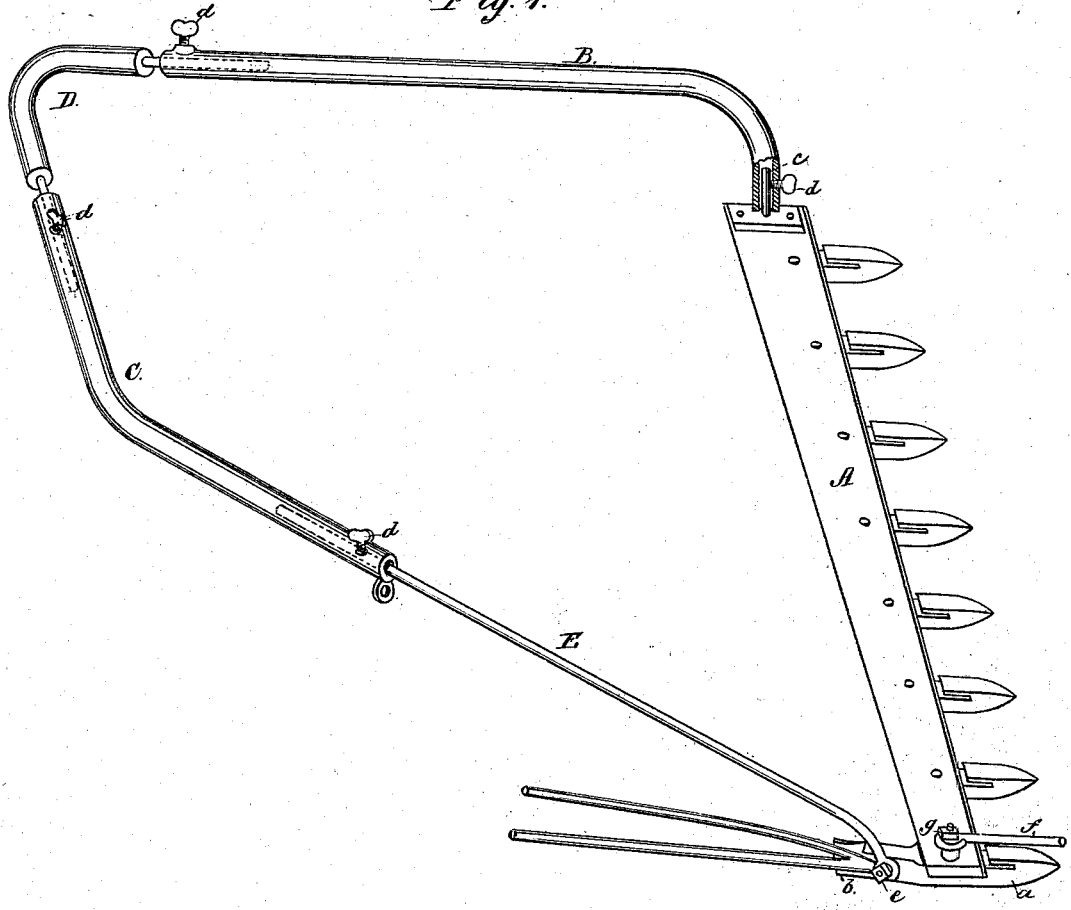
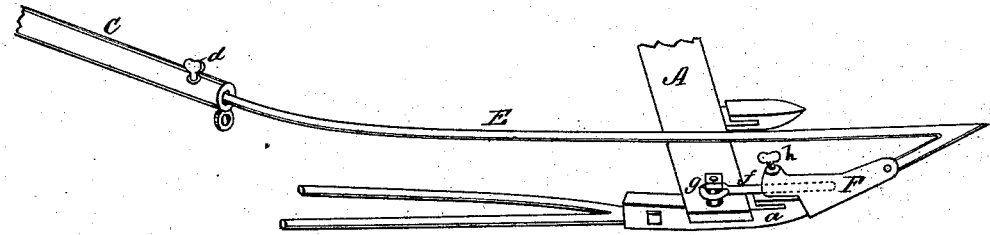
WITNESSES:
W. W. Hollingsworth
Amos W. Hart
INVENTOR:
Wm. Prindle
BY
ATTORNEYS.

UNITED STATES PATENT OFFICE.

WILLIAM PRINDLE, OF SANTA CLARA, CALIFORNIA.

TRACK-CLEARER FOR MOWERS.

SPECIFICATION forming part of Letters Patent No. 229,181, dated June 22, 1880.

Application filed March 6, 1880. (No model.)

*To all whom it may concern:*

Be it known that I, WILLIAM PRINDLE, of Santa Clara, in the county of Santa Clara and State of California, have invented a new and Improved Track-Clearer for Mowers; and I do hereby declare that the following is a full, clear, and exact description of the same.

In cutting grass or grain, more especially if it be heavy, much trouble, annoyance, labor, delay, and expense are entailed by the obstruction offered by the grass or grain previously cut and lying in the previous swath, since it tends to clog the cutter, and thus renders its operation difficult or imperfect, or arrests it altogether. By moving the grass or grain thus cut away from the standing grass or grain the machine has a clear track, so that the cutter-bar can operate with freedom and without danger of becoming clogged.
My invention is an improvement in devices adapted to perform this function; and it is embodied in a certain construction and combination of tubes, rods, and other parts, forming a skeleton-frame which is adjustable, as hereinafter explained.

In accompanying drawings, forming part of this specification, Figure 1 is a perspective view of a finger-bar and my improved track-clearer attached thereto. Fig. 2 is a perspective view of a portion of the finger-bar having one of the rods of the skeleton track-clearer frame attached thereto.

The finger-bar A is shown provided with a shoe, a, having a heel, b, in the usual way.
My track-clearer consists, mainly, of tubes B C and rods D E, which are connected adjustably and form a skeleton-frame, whose ends are attached to the respective ends of the finger-bar, and which projects in rear of the finger-bar, being also elevated above it about the height of ordinary standing grass or grain.

The details of construction are as follows:
The downwardly-curved end of tube B is set on a pin or stud, c, fixed at the inner end of the finger-bar, while the straight portion of said tube extends rearward in a line at about right angles to the finger-bar. The tube C is bent at an obtuse angle, and connected with tube B by means of a curved or angular rod, D, which is preferably constructed with shoulders. The rod E is attached to the outer end of the finger-bar A, as hereinafter described, and its rear end is inserted in tube C. These several parts—to wit, tubes B C and rods D E—are fastened together and to the finger-bar by means of clamp-screws d and a screw-bolt, e, so that the frame is supported rigidly in the required position.

The frame may be raised or lowered by loosening the clamp-screws d at the ends of tube c and rod D, then taking hold of said tube at the curve and lifting or depressing it to the required position. It is then secured by the clamp-screws d, as before.

To enlarge the frame or give it more width the tubes B C are separated, as shown in Fig. 1.

The rod E has two forms. In the one case its forward end has an obtuse angle, as shown in Fig. 1, and in the other it has an acute angle, as shown in Fig. 2.

The obtuse-angled rod E is fastened to the heel b of the finger-bar A by means of the bolt e, and the acute-angled rod E is bolted to the slotted front end of a sheath, F, which is applied to the jointed end of shoe a. Said sheath has a tapering socket to receive the shoe a, and a tubular socket to receive the short rod f, which is clamped by means of a nut on a stud, g, fixed on the finger-bar A. Said rod f is fastened in its socket by means of a clamp-screw, h.

This construction enables the sheath F to be readily attached to and detached from the shoe; and it may be remarked that it is adapted for application to the shoes of all or nearly all mowers.

The acute angle of the rod E, Fig. 2, projects forward of the finger-bar, and serves to divide the grass or grain or lift it up when lodged.

This form of track-clearer has been found to operate practically in a very perfect manner, and enables a mower to work without clogging, since its laterally-inclined portion E will guide and move the cut grass away from the standing grass, so as to leave a clearer space for the inner end of the cutter-bar in cutting the next swath; hence, if the grass is heavy, so that it offers unusual obstruction, nearly twice the amount can be cut in a day that could be cut by a machine provided with the ordinary tail-board or swath-stick. It also lays the grass more evenly, or leaves it in better condition for drying and for the subsequent operations of stirring, raking, &c.

What I claim is—

1. The tubes B C, the bent or angular rods D E, and clamp-screws, in combination with the finger-bar having stud c, substantially as shown and described.

2. The combination of the detachable sheath F with the shoe of a mower finger-bar, and a skeleton track-clearer adapted for attachment to said sheath, substantially as specified.

3. The combination of the sheath F and track-clearer rod E, having an acute angle, which projects forward, as specified.

4. The sheath F, having sockets and clamp-screw and the rod, in combination with the shoe a and finger-bar A, having stud, as shown and described.

WILLIAM PRINDLE.

Witnesses:
JAMES H. HOWARD,
HOWD. PRINDLE.